Sept. 12, 1939.　　　　E. O. ROGGENSTEIN　　　　2,172,759
RECTIFIER CIRCUIT
Original Filed Sept. 22, 1936　　2 Sheets-Sheet 1
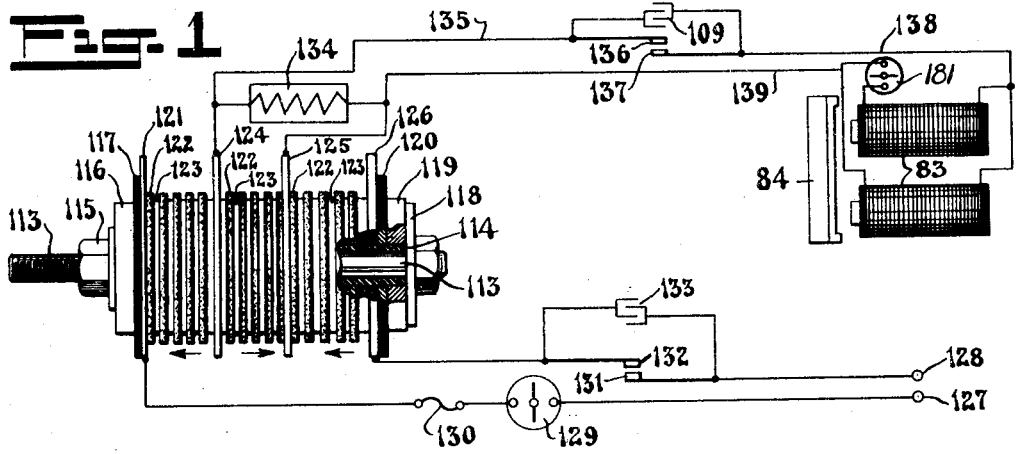
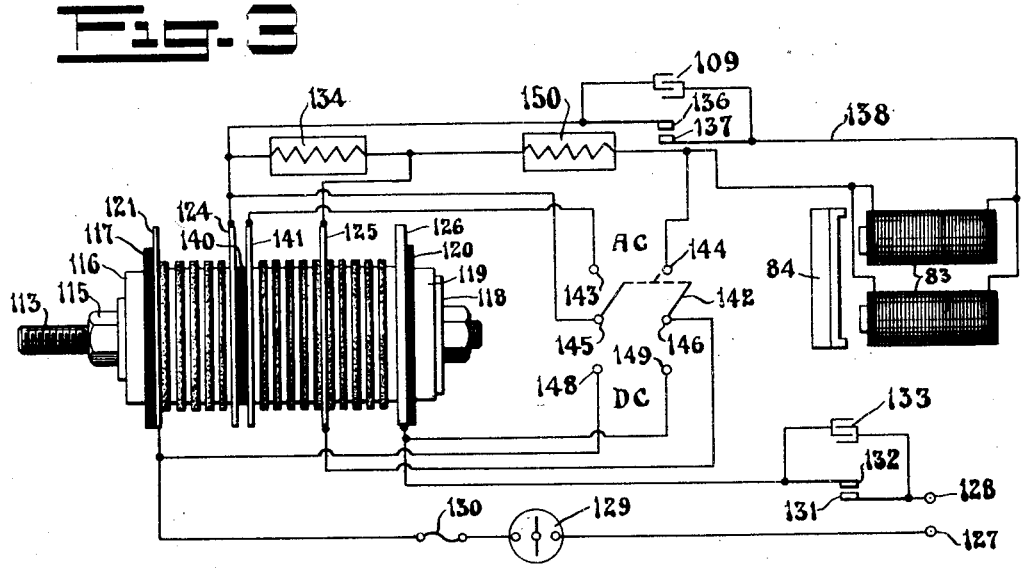
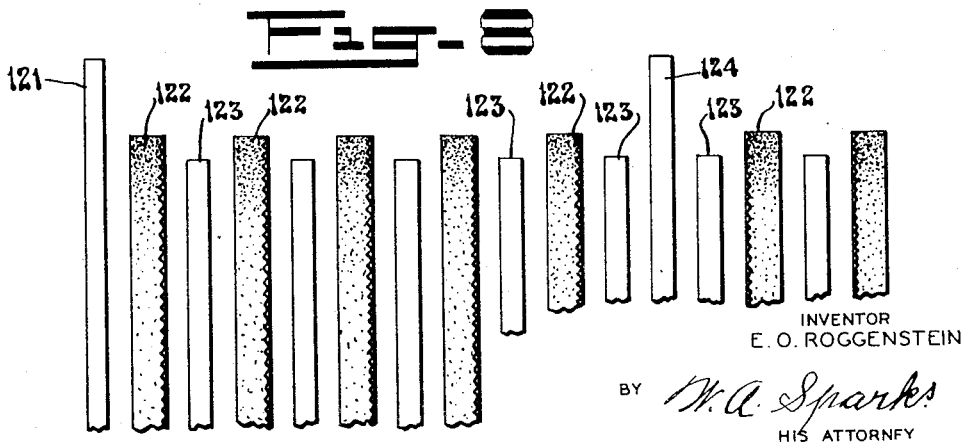
INVENTOR
E. O. ROGGENSTEIN
BY W. A. Sparks
HIS ATTORNEY Sept. 12, 1939.　　　E. O. ROGGENSTEIN　　　2,172,759
RECTIFIER CIRCUIT
Original Filed Sept. 22, 1936　　2 Sheets-Sheet 2
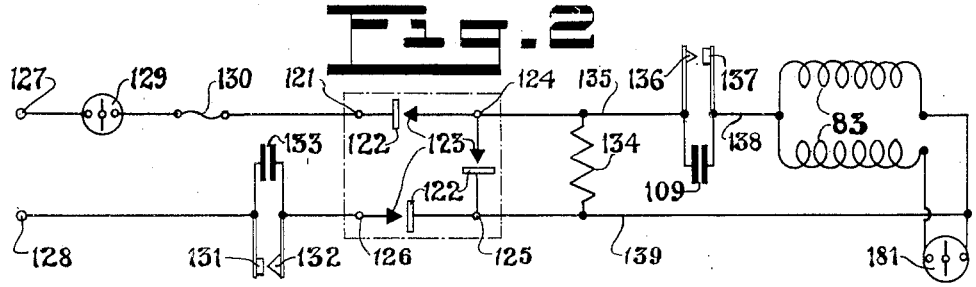
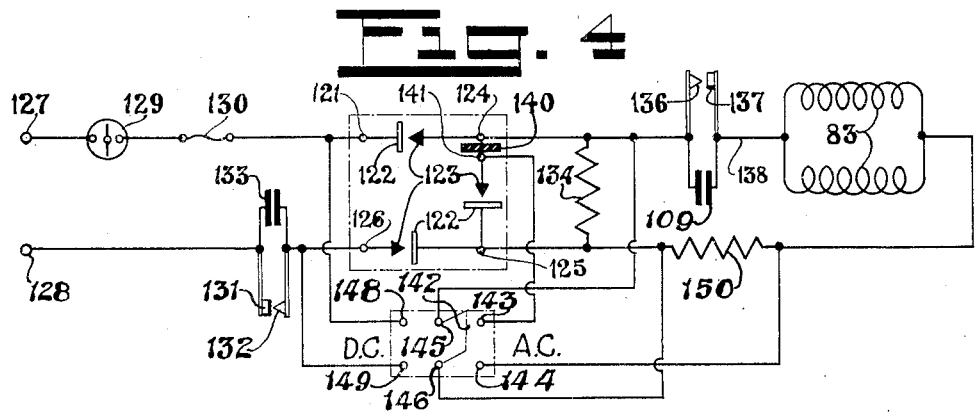
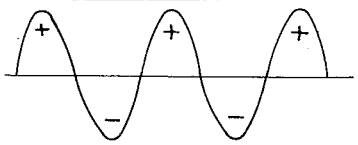
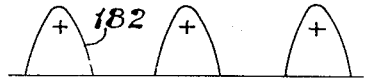
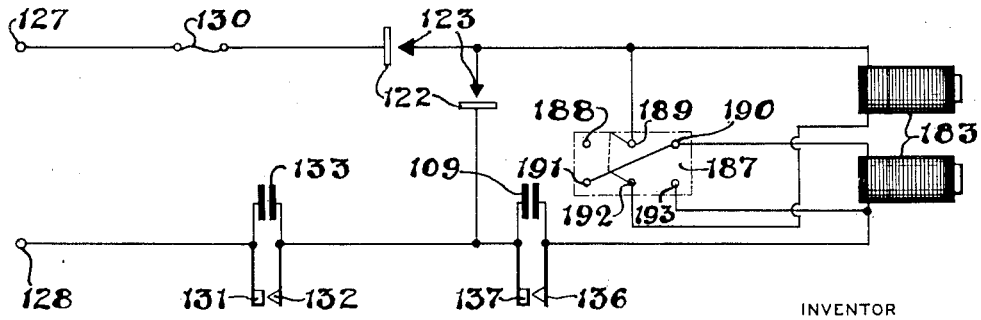
INVENTOR
E. O. ROGGENSTEIN
BY H. A. Sparks
HIS ATTORNEY Patented Sept. 12, 1939

2,172,759

UNITED STATES PATENT OFFICE 2,172,759

RECTIFIER CIRCUIT

Edwin O. Roggenstein, Ilion, N. Y., assignor to Remington Rand Inc., Buffalo, N. Y., a corporation of Delaware Original application September 22, 1936, Serial No. 101,903. Divided and this application September 24, 1938, Serial No. 231,524

4 Claims. (Cl. 175—363)

This invention relates to rectifiers and their associated circuits, and relates particularly to matter divided from my copending application S. N. 101,903 filed September 22, 1936, now Patent No. 2,151,232, issued March 21, 1939, for a Portable universal electric punch.

The invention herein described relates more particularly to dry rectifiers and their associated circuits which have improved regulation characteristics.

Many portable machines such as punches, electric typewriters, and other electrical devices, require a direct current power supply. When a source of direct current power is available the machine may be a small portable device. When direct current is not available, however, it is necessary to provide some sort of rectifier. One manner in which this has been done has been to use a motor generator from which a single machine or a number of machines may be operated. Such a motor generator is, of course, a large, heavy, and expensive piece of equipment, and substantially increases the cost of operation.

At the present time no dry rectifier has been designed for use with a punch, which will supply a high enough voltage so that the current will be low enough for efficient operation, and which is small and light enough to be built into the device so that it may still be portable. It has also been impossible to build a portable dry rectifier for the same reason, that is, so many sections of rectifier are required in order to have high enough voltage, and to provide an adequate margin of safety for satisfactory operation, that such a rectifier would be very large, heavy, and cumbersome and could not be included with a portable device.

The practice where the source of power is alternating has, therefore, heretofore always been to provide a separate rectifier which necessitated that the operated device be used within a limited distance from such rectifiers.

One of the objects of the invention is the provision of a dry disc rectifier which is assembled in such a manner as to provide an adequate source of direct current for the operation of a small machine from either an alternating or direct current power source.

Another object of the invention is the provision of an electrical circuit in connection with such a dry rectifier which will permit the operation of small devices from alternating or direct current.

Another object of the invention is the provision of an alternative circuit which may be used for either A. C. or D. C. operation by the manipulation of a switch depending on which source of power is supplied, and which with D. C. supply will operate with either polarity of current applied to the terminals of the circuit.

Another object of the invention is the provision of the novel rectifier arrangements referred to above, as well as others to be described below, for whatever uses their operating characteristics are suitable.

Other objects and features of the invention will be apparent from the following description of the drawings, in which Fig. 1 is a circuit diagram showing one circuit which may be used in a portable punch or other magnet, operated machine and showing diagrammatically the preferred rectifier assembly;

Fig. 2 is a schematic diagram of the circuit and apparatus shown in Fig. 1;

Fig. 3 is a diagram of an alternative circuit and rectifier assembly to that shown in Fig. 1;

Fig. 4 is a schematic diagram of the circuit and apparatus shown in Fig. 3;

Fig. 5 is a graph illustrating the fluctuations in a source of alternating current;

Fig. 6 is a graph showing the form of rectified current provided by the circuit and apparatus shown in Figs. 1 and 3 when operating in each case from an alternating current power source;

Fig. 7 is a schematic diagram of an alternative half-wave rectifier circuit for A. C. or D. C. operation, using only 20 rectifying junctions;

Fig. 8 is an enlarged exploded view of a portion of the rectifier of Fig. 1.

Similar parts have the same reference numerals throughout the drawings.

In describing the novel features of this machine, reference is made to the circuit diagrams of Figs. 1 and 2. In Fig. 1, is indicated diagrammatically the new rectifier assembly. This rectifier may be made of dry contact rectifying discs of the copper oxide or magnesium copper sulphide type, such as are well known and are described, for example, in United States patents to Ruben No. 1,649,741, of November 15, 1927, No. 1,751,361, of March 18, 1930, and No. 1,751,460, of March 18, 1930, and will be referred to hereafter as simply a copper oxide rectifier. Rectifiers using such discs are manufactured and sold commercially as "Rectox" rectifiers.

In Fig. 1 a number of these discs are shown in one arrangement in which the discs are held together by a central bolt 113 which is insulated from the assembly by an insulating cylinder 114 and which holds the assembly together under pressure by the nut 115 which bears against a heavy disc 116 insulated from the assembly by an insulator 117. At the other end of the assembly there is a washer 118, another heavy disc 119, and another insulator 120, all of which cooperate to hold the rectifying discs together under pressure.

At the left of the assembly of the rectifier proper is a conducting disc 121 which may be of brass. Pressed against this disc is a copper disc 122 (see Fig. 8) having a surface coating of copper oxide or magnesium copper sulphide or any other material which will perform the same function. The coated surface is indicated by the jagged line. This surface is on the right hand side of the copper discs between the discs of 121 and 124 of Fig. 1. Pressed against the copper oxide surface of the first disc 122 is a lead disc 123. The assembly continues with successive copper oxide and lead discs, with the copper oxide coating facing in the same direction until a second conducting disc 124, which may also be of brass, is reached. There is a lead washer next to the disc 124 on each side. From this point the assembly continues with successive lead and copper discs, but it will be noted that at this point the direction in which the copper oxide surfaces face is reversed from the direction in which these surfaces faced between the discs 121 and 124. They continue facing in the new direction until another conducting disc 125, which may also be of brass, is reached, and at this point the direction again reverses. The assembly continues until a fourth conducting disc 126, which may again be of brass, is reached, which is at the right hand edge of the rectifier assembly proper as seen in Fig. 1. A lead disc is placed just next to the disc 126. The direction in which current will flow through each section of this assembly is indicated by the arrows below the sections. The rectifier of Fig. 1 comprises approximately 30 copper oxide discs, ten in each section.

In Fig. 8 is shown an enlargement of a portion of Fig. 1 so the structure may be seen in more detail.

The terminals 127 and 128 may be connected to any power line of alternating current of 110 to 150 volts. A switch 129 and a fuse 130 are provided in the power circuit. A pair of contacts 131 and 132 is connected in this portion of the circuit and a condenser 133 is connected across them to prevent sparking.

In describing these circuits, both in what has been said above and what will follow, that portion of the circuit between the input terminals 127 and 128 up to the rectifier, will be called the power circuit, and that portion of the circuit beyond the rectifier, the load circuit.

Connected across the discs 124 and 125 is a resistance 134, Figs. 1 and 2, which in a preferred embodiment of the invention is approximately 250 ohms. From the disc 124 the load circuit goes by conductor 135, through contacts 136 and 137, to conductor 138, magnet 83, the windings of which may be connected in parallel, conductor 139, back to the disc 125 on the other side of the resistance 134. The condenser 109 is connected across the contacts 136 and 137 to prevent sparking.

The rectifier assembly of Fig. 1 is such that if a positive potential is applied to the terminal 128 and of course if the switch 129 and contacts 131 and 132, are closed, a current will pass from the right to the left in the section of the rectifier from disc 126 to disc 125. At the disc 125 it will be noted again that the direction in which the copper oxide surfaces of the copper discs face between 125 and 124 is different from the direction in which they face between the discs 126 and 125. Between the discs 125 and 124, therefore, no current will pass except leakage current. At the disc 124 the direction of the copper oxide surface is again reversed so that current would pass between the discs 124 and 121. As the rectifier therefore permits current to flow from disc 126 to disc 125 and from disc 124 to disc 121 it will be seen that a circuit may be completed across the discs 125 and 124 and therefore by this connection current will be permitted to flow through the circuits of the load.

If a positive potential is applied to the terminal 127 no current can flow between the discs 121 and 124 nor can current flow between the discs 125 and 126 so that the machine will not operate from a direct current power source unless the connection is made with the proper polarity.

If an alternating current power source is connected across the terminals 127 and 128 the rectifier will operate to rectify the positive pulses of potential applied to the terminal 128 and pass current in this direction in the same manner as it passes direct current applied with the positive potential to terminal 128. This is illustrated in Figs. 5 and 6.

In Fig. 5 the fluctuations of an alternating current source is shown and in Fig. 6, the rectified positive pulses are shown. It will thus be seen that when operating from alternating current a pulse passes through the rectifier for each positive half cycle on the terminal 128 and that this rectified current is permitted to flow through the load circuit across the discs 125 and 124. The wave shape of the rectified pulses is not known exactly, so Fig. 6 is simply illustrative of the operation as to time.

When it is desired to use this circuit for intermittent duty with loads such as punches, bells, and other signalling equipment, the actuating lever of the device is arranged so as to make contacts 131, 132, and 136, 137 simultaneously at the start of the action and to break them at the finish.

In Fig. 2 is shown a schematic diagram of the circuit in Fig. 1 and corresponding parts are similarly numbered. Here is shown a rectangle 122 and a solid triangle 123 to indicate a section of the copper oxide rectifier. The current flow is in the direction of the point of the solid triangle. It will be seen from Fig. 2 that when a positive source of current is applied to the terminal 128 it cannot pass through the middle portion of the rectifier due to the direction of flow from 125 to 124 but it can pass through both end sections of the rectifier and the circuit can be completed through the load circuit.

In Figs. 3 and 4 is shown an alternative circuit arrangement which may also be used for operating from alternating or direct current. In this circuit the polarity of the D. C. source does not matter as the circuit will operate equally well whichever polarity is present on the terminals 127 or 128. In this circuit the rectifier is assembled just as before except that an insulating disc 140 and an extra conducting disc 141 are inserted at the positions shown. A double-pole, double-throw switch 142 is provided which for operation on direct current is thrown to its lower position (Fig. 3) to connect with the terminals 148 and 149. In operating on direct current, therefore, with the terminals 148 and 149 connected to the terminals 145 and 146 through the switch 142, the circuit is as follows: From terminal 127, through switch 129, fuse 130, terminal 148, switch 142, terminal 145, contacts 136 and 137, conductor 138, magnet 83, resistance 150, which simply reduces the amount of current so that it will not exceed current drawn by the machine when operating from alternating current disc 125, to terminal 146, switch 142, terminal 149, contacts 131 and 132, back to terminal 128. It will thus be seen that when operating on direct current with this circuit the rectifier is completely shunted out of the circuit and it is for this reason that the polarity of the current supplied to the terminals 127 and 128 does not matter. It will also be noted that the resistance 150 permits the current drawn by the load to be reduced so that it does not exceed the current drawn by the machine when operating on alternating current. It is provided because the rectifier is shunted out of the circuit. It also avoids the use of a switch such as the switch 181 of Figs. 1 and 2.

When operating the circuits of Figs. 3 and 4 on alternating current, the switch 142 is thrown to its upper position (Fig. 3) so that it makes contact with terminals 143 and 144. The circuit is then from terminal 128, through contacts 131, 132, disc 126 through the section of the rectifier from disc 126 to disc 125, through terminal 146, switch 142, terminal 144, magnet 83, conductor 138, contacts 136 and 137, disc 124, through the section of the rectifier from disc 124 to disc 121, through fuse 130 and switch 129, back to terminal 127. It will be noted that the insulating disc 140 is short-circuited by the connection from disc 124, terminal 145, switch 142 and terminal 143, back to the disc 141, so there is a leakage path in shunt to resistance 134 in the section of the rectifier from disc 125 to disc 124, as in Fig. 1. It will also be noted from the circuit description above that the resistance 150 is shunted out of the circuit. The circuit of Figs. 3 and 4, therefore, with the switch in its upper position (Fig. 3) for alternating current operation, is identical with the circuit of Figs. 1 and 2, while with the switch 142 in its lower position for direct current operation the rectifier is shunted entirely out of the circuit and resistance 150 is placed in series with the load.

Referring again to Fig. 1, the successful operation of this device is possible because of the novel manner of assembling the discs of the rectifier shown in that figure. Whenever there is a positive half cycle of current applied to the terminal 127 there is a certain amount of leakage current through the rectifier between discs 121 and 124 and discs 125 and 126 in spite of the fact that these discs are arranged not to pass current in this direction. By including a rectifier unit between the discs 124 and 125 this leakage current is by-passed during one half cycle without changing the circuit characteristics during the other half cycle.

By breaking the contacts 131 and 132 at each operation of the machine the drawing of excess or unneeded current through the rectifier and also its overheating is prevented but at the same time sufficient voltage and current for efficient operation of the machine is provided. The leakage path provided in parallel with the load circuit across the middle section of the rectifier serves an important function in the operation of the circuit.

In Fig. 7 I have shown an alternative circuit for half wave rectification in which only two sections of a rectifier assembly are used, each section comprising ten discs or junctions. It will be understood that each of the sections 122, 123 is arranged similarly to those already described in Figs. 1 and 8, except that they are of ten junctions each. This circuit is identical with those already described in connection with Figs. 1, 2, 3, and 4 except for the arrangement of the rectifier and the provision of a double-pole, double-throw switch 187. In this case when a D. C. supply is used positive potential must be applied to terminal 128. The contacts are the same as above described, that is both switches 131, 132 and 136, 137 are opened by the magnet 83 upon its operation. The double pole, double-throw switch 187 has two terminals 188, 191 which are closed for D. C. operation by throwing the switch to the left and connecting terminal 189 with 188 and terminal 192 with 191. This causes the coils of the magnet 83 to be arranged in series. This arrangement is provided due to the fact that the voltage applied to the magnet coils for D. C. operation with this circuit is double that applied to the magnet coils when operating from A. C. When operating from A. C. the poles in the switch 187 are closed to the right to make contact between terminals 189 and 190 and between 192 and 193. This causes the magnet coils to be arranged in parallel.

From the above description it will be apparent that this invention resides in certain principles of construction and operation as illustrated in the drawings. It is recognized that those skilled in the art may readily vary the application of these principles and the structure by which they are applied without departing from the scope of the invention. I do not, therefore, desire to be strictly limited to the disclosure as given, but rather to the scope of the appended claims.

What I claim as new, and desire to secure by Letters Patent, is:

1. A circuit for the output of a dry contact rectifier, said circuit comprising thirty unilaterally conductive discs stacked in concentric alignment and arranged in three sections, the two outer sections of ten discs each so stacked as to pass current in one direction and the intermediate section of ten discs so stacked as to pass current in the opposite direction.

2. A rectifier circuit for converting alternating current into pulsating current comprising a stack of unilaterally conductive discs arranged in three sections in series across the alternating current supply, said sections composed of a plurality of rectifier discs of the copper oxide type, the two outer of said sections so arranged as to pass current in one direction, and the intermediate section arranged to pass current in the opposite direction.

3. A rectifier circuit for converting alternating current into pulsating current comprising a stack of unilaterally conductive discs arranged in three sections in series across the alternating current supply, said sections composed of a plurality of rectifier discs of the copper oxide type, the two outer of said sections so arranged as to pass current in one direction, and the intermediate section arranged to pass current in the opposite direction, and a load circuit connected in parallel with the intermediate section.

4. A rectifier circuit for converting alternating current into pulsating current comprising a plurality of unilaterally conductive discs of the copper oxide type stacked in concentric alignment and divided into three sections, the end sections arranged to pass current in one direction and the central section arranged to pass current in the reverse direction, and a load circuit connected in parallel with the central section.

EDWIN O. ROGGENSTEIN.